(12) United States Patent
Klatt

(10) Patent No.: US 8,180,345 B2
(45) Date of Patent: May 15, 2012

(54) METHOD FOR OPTIMIZING THE LOAD DISTRIBUTION BETWEEN A FIRST MOBILE RADIO NETWORK AND A SECOND MOBILE RADIO NETWORK

(75) Inventor: Axel Klatt, Köln (DE)

(73) Assignee: T-Mobile International AG, Bonn (DE)

( * ) Notice: Subject to any disclaimer, the term of this patent is extended or adjusted under 35 U.S.C. 154(b) by 831 days.

(21) Appl. No.: 12/264,813

(22) Filed: Nov. 4, 2008

(65) Prior Publication Data
US 2009/0075657 A1    Mar. 19, 2009

Related U.S. Application Data

(63) Continuation of application No. PCT/EP2007/003896, filed on May 3, 2007.

(30) Foreign Application Priority Data

May 5, 2006   (DE) .......................... 10 2006 021 281

(51) Int. Cl.
*H04W 36/22* (2009.01)

(52) U.S. Cl. ...................... 455/436; 455/453; 455/552.1; 455/561.1; 455/433; 455/437; 370/331; 370/329; 370/310; 370/466

(58) Field of Classification Search .............. 455/552.1, 455/561.1–561.2, 432.1, 433, 436, 453, 437; 370/331, 329, 466, 310
See application file for complete search history.

(56) References Cited

U.S. PATENT DOCUMENTS

| | | | |
|---|---|---|---|
| 5,504,939 A | | 4/1996 | Mayrand et al. |
| 6,792,277 B2* | | 9/2004 | Rajaniemi et al. ......... 455/456.1 |
| 6,963,745 B2 | | 11/2005 | Singh et al. |
| 7,400,593 B2* | | 7/2008 | Choi et al. ..................... 370/310 |
| 7,539,160 B2* | | 5/2009 | Virtanen et al. .............. 370/329 |
| 7,649,865 B2* | | 1/2010 | Sarkkinen ..................... 370/331 |
| 2003/0114158 A1 | | 6/2003 | Soderbacka et al. |
| 2007/0041343 A1 | | 2/2007 | Barreto et al. |
| 2007/0249359 A1 | | 10/2007 | Barbaresi |

FOREIGN PATENT DOCUMENTS

| | | |
|---|---|---|
| DE | 10301670 A1 | 8/2004 |
| EP | 1519607 A | 3/2005 |

(Continued)

OTHER PUBLICATIONS

3GPP-TSG-RAN 25.331 CR 2765, Meeting 51, Denver, USA, Tdoc: R2-060799, 10 pages (Feb. 13-17, 2006).

(Continued)

*Primary Examiner* — Charles Appiah
*Assistant Examiner* — Michael Vu
(74) *Attorney, Agent, or Firm* — The Maxham Firm

(57) ABSTRACT

A method for optimizing the load distribution between one mobile radio network, for example using the UMTS standard, and another mobile radio network, for example using the GSM standard, by optimizing the signalling sequence when establishing a connection in such a mobile radio system. It enables efficient cooperation when establishing a connection, for example a voice connection, between a UMTS and a GSM network. In addition to the efficient use of resources in a UMTS system, the method also enables direct establishment of a connection, for example of a voice connection that was initiated in a UMTS network, in a GSM network.

19 Claims, 2 Drawing Sheets

FOREIGN PATENT DOCUMENTS

WO    2005004507 A1    1/2005

OTHER PUBLICATIONS

3GPP TS 25.331 version 7.0.0 Release 7, "Universal Mobile Telecommunications System (UMTS); Radio Resource Control (RRC) protocol specification," 6 pages (Mar. 2006).

Search Report from the German Patent and Trademark Office, 3 pages (Apr. 11, 2007).

International Search Report, 4 pages (Aug. 22, 2007).

Written Opinion of the International Searching Authority, 4 pages (Jul. 23, 2008).

* cited by examiner

METHOD FOR OPTIMIZING THE LOAD DISTRIBUTION BETWEEN A FIRST MOBILE RADIO NETWORK AND A SECOND MOBILE RADIO NETWORK

FIELD OF THE INVENTION

The present invention relates generally to a method for optimizing the load distribution between a first mobile radio network and a second mobile radio network by optimizing the signaling sequence when establishing a connection in such a mobile radio system. In particular, the invention concerns a method for optimizing the establishment of a connection for a voice/video call or a packet connection in a mobile radio network, and for load distribution in various mobile radio systems.

BACKGROUND OF THE INVENTION

Mobile radio network operators currently have the option of operating not only the prevalent mobile radio systems using the GSM standard, but also networks using the new UMTS standard. Established network operators often currently set up a UMTS network, in parallel to an existing GSM network, which is characterized by the provision of expanded functionalities such as multimedia connections and higher packet data rates. At the present time, network operators operating on GSM as well as UMTS networks typically operate their networks in such a way that so-called dual-mode mobile telephones, that is, mobile telephones, which support both GSM and UMTS networks, preferably "camp" on the UMTS network. In this context, "camping" refers to the state of the mobile telephone in which no active connection exists between the mobile telephone and the mobile radio network, but the mobile telephone is logged onto the UMTS network (see Specification 3GPP TS25.3•04). If such a "camped" mobile telephone then attempts to establish a voice connection, for example, with the mobile radio network, using the UMTS standard the mobile telephone sends an RRC CONNECTION REQUEST message to the mobile radio network, as may be learned from technical specification ETST TS125.331, V7.0.0; Universal Mobile Telecommunications System (UMTS); Radio Resource Control (RRC) Protocol Specification; March 2006: (see 3GPP TS 25.331, Version 7.0.0, Release 7). According to the prior art, the mobile radio network then establishes the desired voice connection in the UMTS network and sets up the connection with the called party and the calling subscriber. A voice connection thus occupies resources of the UMTS network. Alternatively, this connection could be implemented on the GSM portion of the mobile radio network, since this portion is able to meet the technical requirements for serving the needs of a simple voice connection.

In such mobile radio networks, to avoid unnecessary occupation of resources by simple voice connections as the result of the preferential camping of all dual-mode mobile telephones on the UMTS network, and with increasing prevalence of UMTS- and GSM-capable devices, to prevent "idling" of the established GSM networks due to the preferred camp strategy of dual-mode mobile telephones on the UMTS portion of the mobile radio network, appropriate measures are necessary to make further use of the free resources of the GSM portion of a mobile radio network.

In the prior art, mobile radio operators are currently able to use technologies which, in a given phase of establishing a connection or using an existing connection, "redirect" the voice connection from the UMTS portion of the mobile radio network to the GSM portions of the same mobile radio network in order to once again utilize, as needed, unused resources on the GSM network. These technologies are often referred to as "service-based handover" or "directed retry" in the specifications for the mobile radio network (www.3gpp.org).

The primary disadvantage of the prior art is that the decision to carry out the service-based handover or directed retry can be made only in a very late phase of establishing a connection, namely, only at the time at which, for the mobile radio network for example, the radio network controller (RNC) for UMTS, the particular reason for starting the establishment of a connection, is known. Although the mobile telephone, using the UMTS standard according to (3GPP TS25.331), communicates information concerning the reason for establishing the connection to the network in the RRC CONNECTION REQUEST or CELL UDPATE message, the currently available "establishment causes" do not allow an unambiguous conclusion to be drawn concerning the particular service for which the connection is to be established. The reason for the channel request, for example, voice transmission, data transmission, among others, is specified in the information element establishment cause. Using the currently available establishment causes it is not possible in particular to unambiguously determine whether a circuit-switched (CS) voice connection, a simple voice service (possible via UMTS and GSM), a voice connection using the wideband AMR codec, or a video telephone conversation (only possible in UMTS) is requested by the mobile telephone for the connection establishment request. This information is not available to the radio network control (RNC) as a control function for the radio access network until the time that an RRC connection has been established between the mobile radio device and the radio network control unit and further signaling in the direction of the core network (CN) has been carried out via the Iu interface (3GPP TS 25.413). According to the prior art, the earliest point in time of the decision as to whether a voice or video service is to be established is the arrival of the RANAP: RAP ASSIGNMENT message.

WIPO patent application publication, WO 2005/101880 A1, discloses a method for optimizing the load distribution between a first mobile radio network, for example, using the UMTS standard, and a second mobile radio network, for example, using the GSM standard, in which accurate information concerning the type of connection request is provided to a radio network control unit for a radio access network in the earliest possible phase of establishing a connection with a mobile radio device. On the basis of this information a resource allocation between the two mobile radio networks is made before the radio access network (RAN) has established a connection with a core network of one of the mobile radio networks.

SUMMARY OF THE INVENTION

A purpose of the invention is to provide a method for optimizing the load distribution between a first mobile radio network using the UMTS standard and a second mobile radio network using the GSM standard, the method being carried out in a very early phase of establishing a connection.

The method according to an embodiment of the present invention allows various voice and video calls to be distinguished in a very early phase of establishing a connection. This method also has the important advantage that the RNC is able to configure certain procedures, such as the potential reservation of resources and the configuration of "compressed mode," for measuring GSM cells before arrival of the RANAP: RAB ASSIGNMENT message for the mobile radio device.

The method of the invention may be advantageously used in a mobile radio system using E-UTRAN or in another standardized mobile radio system such as WLAN, WiMAX, or cdma200 EV-DO.

The method according to an embodiment of the invention is based on expanding the establishment causes, which are defined in (3GPP TS 25.331) for a mobile radio system using the UMTS standard, in such a way that, in a very early phase of establishing a connection, specifically, before arrival of the CN signaling (signaling from the core network) in the RANAP: RAB ASSIGNMENT, the RNC is able to draw a conclusion concerning the desired service and to use this information for providing configurations or initiating a service-based handover (for a voice connection) using GSM.

According to an alternative embodiment of the method according to the invention, instead of expanding the establishment causes already present in the specifications, new information elements are introduced which allow a conclusion to be drawn concerning the requested service in the early phase of establishing a connection (that is, in the RRC CONNECTION REQUEST message).

In one exemplary embodiment of the method according to the invention, the messages for transmitting the connection request of a mobile telephone using the UMTS standard are expanded in such a way that, in addition to the currently existing establishment causes defined in (3GPP T825.331), at least two additional establishment causes are defined which allow a distinction to be made between the connection request for a voice connection and for a video connection in the first phase of establishing a connection. For this purpose, the invention provides for the addition of the following additional establishment causes: originating CS voice call, terminating CS voice call, originating CS video call, and terminating CS video call. Alternatively, this information may also be transmitted in a newly defined information element within the RRC CONNECTION REQUEST message.

The advantage of the method according to embodiments of the invention, compared to the prior art, results from the fact that in the first phase of establishing a connection, that is, after transmitting the RRC CONNECTION REQUEST or CELL UPDATE message, for example, the RNC is able to make appropriate decisions based on the distinction between voice and video connections without waiting for transmission of the CN-initiated RANAP: RAB ASSIGNMENT message.

Also according to embodiments of the invention, an RNC which receives the corresponding information in the RRC CONNECTION REQUEST or CELL UPDATE message is able to "redirect" a connection request for a voice connection, according to the RRC connection reject procedure (3GPP TS 25.331) using GSM, in order to make use of any free resources in the GSM system for implementing the voice connection. Alternatively, this information may be used in the early period of establishing a connection in order to reserve corresponding radio bearer configurations, to configure the mobile radio device using measurement configurations (compressed mode), or to carry out other procedures.

BRIEF DESCRIPTION OF THE DRAWING

The invention is more fully explained by the following detailed description of advantageous embodiments of the same, reference being made to the appended drawing figures, in which.

DETAILED DESCRIPTION OF THE PREFERRED EMBODIMENTS

The drawings and the text herein use the standardized English terms, used worldwide by those skilled in the art, for signaling messages and their information content.

Figure 1:
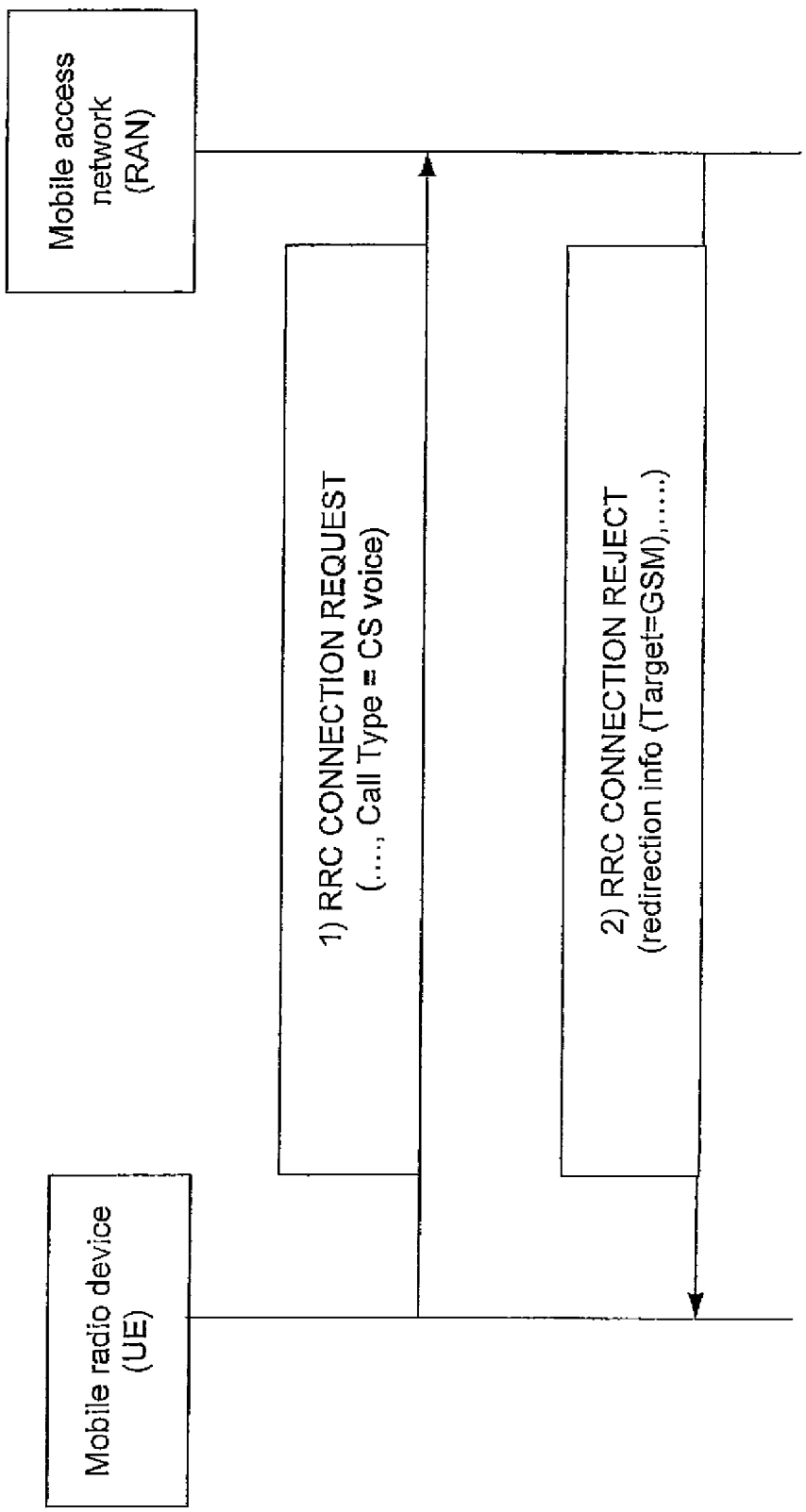
FIG. 1 shows by way of example signaling between a mobile radio device UE and a radio access network RAN for rerouting of a connection request based on a call type indication.

As an exemplary embodiment of the method according to the invention, FIG. 1 illustrates by way of example signaling between a mobile radio device (UE) and a radio access network (RAN). A connection request is redirected on the basis of a call type indication without the need to establish a connection between the RAN and a core network (CN).

Mobile radio device UE transmits a connection request to radio access network RAN or the associated radio network control (RNC). For this purpose the mobile radio device transmits an RRC connection request message to the RNC (step 1). The RRC connection request message contains, among others, a call type information field which contains information as to whether the connection request involves, for example, voice (CS voice), data, or video. On the basis of the call type information the RAN is able to redirect the connection to another radio access technology (GSM, LTE) or at another UMTS frequency before the RAB ASSIGNMENT message arrives from the core network, and without having to establish a connection to the core network.

For example, an RNC which receives the corresponding call type (CS voice) information in the RRC CONNECTION REQUEST or CELL UPDATE message is able to "redirect" the connection request for the requested voice connection, using an RRC connection reject procedure (3GPP TS 25.331), to an available GSM network in order to use any free resources in the GSM system for implementing the voice connection (step 2).

Figure 2:
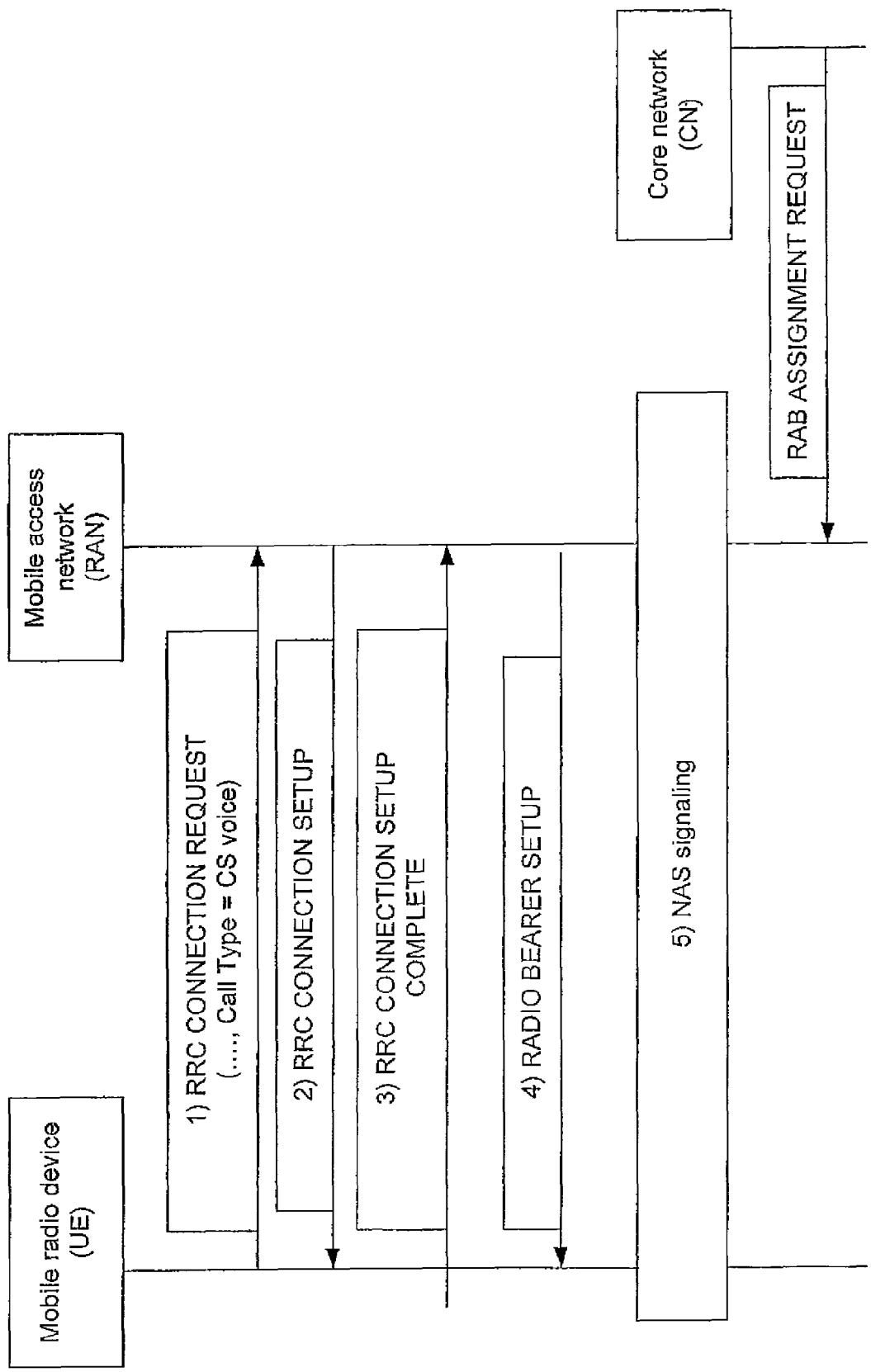
FIG. 2 shows by way of example signaling between a mobile radio device UE, a radio access network RAN, and a core network (CN) for a preconfiguration of a radio bearer on the basis of the signaling in an RRC connection request message.

FIG. 2 illustrates signaling between mobile radio device UE, radio access network RAN, and core network (CN) for a preconfiguration of a radio bearer on the basis of the signaling in the RRC connection request message. According to the invention, the preconfiguration may occur before an RAB request from the core network arrives in the radio access network.

Mobile radio device UE transmits a connection request to the radio access network or the associated radio network control. For this purpose the mobile radio device transmits an RRC connection request message to the RNC (step 1). The RRC connection request message contains, among others, a call type information field which contains information as to whether the connection request involves voice (CS voice), data, or video, for example. On the basis of this call type information the RAN is able to establish a corresponding radio bearer by transmitting an RRC connection setup message to the mobile radio device (step 2) which is acknowledged by the mobile radio device using an RRC connection setup complete message (step 3). By means of a radio bearer setup message a radio bearer suitable for the connection request is then assigned (step 4).

The standardized signaling (NAS signaling) may then be continued (step 5).

Only then is an RAB ASSIGNMENT message sent from core network CN.

Thus, in the present example the call type information is used at an early period in establishing a connection in order to reserve a corresponding radio bearer configuration before an RAB assignment message arrives from the core network. In this early stage of establishing a connection the mobile radio device may also be configured with measurement configurations (compressed mode), or other procedures may be carried out.

What is claimed is:

1. A method for optimizing the load distribution between a first mobile radio network using a first standard and a second mobile radio network using a second standard, the method comprising:
   providing accurate information concerning the type of connection request to a radio network control unit for a radio access network (RAN) in the earliest possible phase of establishing a connection with a mobile radio device;
   on the basis of this information, allocating resources between the two mobile radio networks before the RAN has established a connection with a core network of one of the mobile radio networks, the mobile radio device indicating in an RRC CONNECTION REQUEST, using the first standard, whether the connection request is voice, video, or some other classified connection;
   on the basis of this information, establishing in the RAN a corresponding radio bearer by transmitting an RRC connection setup message to the mobile radio device which is acknowledged by the mobile radio device using an RRC connection setup complete message; and then
   assigning, by means of a radio bearer setup message, a radio bearer suitable for the connection request;
   continuing standardized NAS signaling; and then
   sending an RAB ASSIGNMENT message by the core network to the radio access network.

2. The method according to claim 1, wherein the first standard is the UMTS standard.

3. The method according to claim 2, wherein the second standard is the GSM standard.

4. The method according to claim 2, and further comprising:
   using the UMTS as the first standard, providing accurate information concerning the connection request in the RRC CONNECTION REQUEST message by means of the mobile radio device; and
   configuring corresponding channels, transport channels, and/or radio bearers between the radio network control unit and the mobile radio device directly after a classification of a requested service using the radio network control unit for the first mobile radio network;
   whereby the configuring does not wait for signaling from the core network in the RANAP: RAB ASSIGNMENT message.

5. The method according to claim 2, and further comprising:
   using the UMTS standard as the first standard, providing accurate information concerning the connection request in the RRC CONNECTION REQUEST message by means of the mobile radio device; and
   making decisions as to whether the selected service can also be carried out in the second mobile radio network directly after a classification of a requested service using the radio network control unit for the first mobile radio network.

6. The method according to claim 2, and further comprising:
   using the UMTS standard as the first standard, providing accurate information concerning the connection request in the RRC CONNECTION REQUEST message by means of the mobile radio device;
   making decisions as to whether the selected service can also be carried out in the second mobile radio network directly after a classification of a requested service using the radio network control unit for the first mobile radio network;
   initiating a direct retry for an NB-AMR connection or a CS voice connection during the signaling phase in order to establish the connection directly via the second mobile radio network; and then
   transferring the connection via handover to the second mobile radio network or via another technology so that no UTRAN resources of the one mobile radio network are allocated.

7. The method according to claim 2, and further comprising:
   using the UMTS standard as the first standard, providing accurate information concerning the connection request in the RRC CONNECTION REQUEST message by means of the mobile radio device;
   making decisions which are used for further internal processing by the radio network control unit directly after a classification of a requested service using the radio network control unit for the first mobile radio network.

8. The method according to claim 1, wherein the mobile radio device indicates in the RRC CONNECTION REQUEST message, using the UMTS standard as the first standard, whether the connection request is for a voice connection using narrowband AMR NB-AMR voice codec or wideband AMR WB-AMR codec.

9. The method according to claim 1, and further comprising:
   using the UMTS as the first standard, providing accurate information concerning the connection request in the RRC CONNECTION REQUEST message by means of the mobile radio device; and
   configuring corresponding channels, transport channels, and/or radio bearers between the radio network control unit and the mobile radio device directly after a classification of a requested service using the radio network control unit for the first mobile radio network;
   whereby the configuring does not wait for signaling from the core network in the RANAP: RAB ASSIGNMENT message.

10. The method according to claim 9, and further comprising:
    using the UMTS standard as the first standard, providing accurate information concerning the connection request in the RRC CONNECTION REQUEST message by means of the mobile radio device; and
    making decisions as to whether the selected service can also be carried out in the second mobile radio network directly after a classification of a requested service using the radio network control unit for the first mobile radio network.

11. The method according to claim 1, and further comprising:
    using the UMTS standard as the first standard, providing accurate information concerning the connection request in the RRC CONNECTION REQUEST message by means of the mobile radio device; and making decisions as to whether the selected service can also be carried out in the second mobile radio network directly after a classification of a requested service using the radio network control unit for the first mobile radio network.

12. The method according to claim 1, and further comprising:
using the UMTS standard as the first standard, providing accurate information concerning the connection request in the RRC CONNECTION REQUEST message by means of the mobile radio device;
making decisions as to whether the selected service can also be carried out in the second mobile radio network directly after a classification of a requested service using the radio network control unit for the first mobile radio network;
initiating a direct retry for an NB-AMR connection or a CS voice connection during the signaling phase in order to establish the connection directly via the second mobile radio network; and then
transferring the connection via handover to the second mobile radio network or via another technology so that no UTRAN resources of the one mobile radio network are allocated.

13. The method according to claim 1, and further comprising:
using the UMTS standard as the first standard, providing accurate information concerning the connection request in the RRC CONNECTION REQUEST message by means of the mobile radio device;
making decisions which are used for further internal processing by the radio network control unit directly after a classification of a requested service using the radio network control unit for the first mobile radio network.

14. The method according to claim 1, which is used in a mobile radio system using E-UTRAN or another standardized mobile radio system selected from WLAN, WiMAX, and cdma2000EV-DO.

15. A system comprising at least one computer processing unit CPU and a memory, and means for carrying out the steps of the method according to claim 1.

16. A method for optimizing the load distribution between a first mobile radio network using a first standard and a second mobile radio network using a second standard, the method comprising:
providing accurate information concerning the type of connection request to a radio network control unit for a radio access network (RAN) in the earliest possible phase of establishing a connection with a mobile radio device;
on the basis of this information, allocating resources between the two mobile radio networks before the RAN has established a connection with a core network of one of the mobile radio networks, the mobile radio device indicating in an RRC CONNECTION REQUEST, using the first standard, whether the connection request is voice, video, or some other classified connection;
on the basis of this information, establishing in the RAN a corresponding radio bearer by transmitting an RRC connection setup message to the mobile radio device which is acknowledged by the mobile radio device using an RRC connection setup complete message; then
assigning, by means of a radio bearer setup message, a radio bearer suitable for the connection request;
continuing standardized NAS signaling; then
sending an RAB ASSIGNMENT message by the core network to the radio access network;
using the UMTS standard as the first standard, providing accurate information concerning the connection request in the RRC CONNECTION REQUEST message by means of the mobile radio device; and
making decisions as to whether the selected service can also be carried out in the second mobile radio network directly after a classification of a requested service using the radio network control unit for the first mobile radio network;
whereby the otherwise customary configuration of a compressed mode is not carried out when it is determined that the selected service cannot be carried out in the second mobile radio network.

17. The method according to claim 16, wherein the first standard is the UMTS standard, the method further comprising:
using the UMTS standard as the first standard, providing accurate information concerning the connection request in the RRC CONNECTION REQUEST message by means of the mobile radio device; and
making decisions as to whether the selected service can also be carried out in the second mobile radio network directly after a classification of a requested service using the radio network control unit for the first mobile radio network;
whereby the otherwise customary configuration of a compressed mode is not carried out when it is determined that the selected service cannot be carried out in the second mobile radio network.

18. A nontransitory computer readable storage medium for use with a computer in a mobile communication device for optimizing the load distribution between a first mobile radio network using a first standard and a second mobile radio network using a second standard, wherein the computer readable storage medium includes computer executable program instructions for causing the computer to perform and/or enable the steps of:
providing accurate information concerning the type of connection request to a radio network control unit for a radio access network (RAN) in the earliest possible phase of establishing a connection with a mobile radio device;
on the basis of this information, allocating resources between the two mobile radio networks before the RAN has established a connection with a core network of one of the mobile radio networks, the mobile radio device indicating in an RRC CONNECTION REQUEST, using the first standard, whether the connection request is voice, video, or some other classified connection;
on the basis of this information, establishing in the RAN a corresponding radio bearer by transmitting an RRC connection setup message to the mobile radio device which is acknowledged by the mobile radio device using an RRC connection setup complete message; then
assigning, by means of a radio bearer setup message, a radio bearer suitable for the connection request;
continuing standardized NAS signaling; and then
sending an RAB ASSIGNMENT message by the core network to the radio access network.

19. A nontransitory computer readable storage medium for use with a computer in a radio network control unit for optimizing the load distribution between a first mobile radio network using a first standard and a second mobile radio network using a second standard, wherein the computer readable storage medium includes computer executable program instructions for causing the computer to perform and/or enable the steps of:

providing accurate information concerning the type of connection request to a radio network control unit for a radio access network (RAN) in the earliest possible phase of establishing a connection with a mobile radio device;

on the basis of this information, allocating resources between the two mobile radio networks before the RAN has established a connection with a core network of one of the mobile radio networks, the mobile radio device indicating in an RRC CONNECTION REQUEST, using the first standard, whether the connection request is voice, video, or some other classified connection;

on the basis of this information, establishing in the RAN a corresponding radio bearer by transmitting an RRC connection setup message to the mobile radio device which is acknowledged by the mobile radio device using an RRC connection setup complete message; then assigning, by means of a radio bearer setup message, a radio bearer suitable for the connection request;

continuing standardized NAS signaling; and then sending an RAB ASSIGNMENT message by the core network to the radio access network.

* * * * *